United States Patent
Qu et al.

(10) Patent No.: US 10,208,794 B2
(45) Date of Patent: Feb. 19, 2019

(54) WATER LUBRICATED COMPOSITE THRUST BEARING OF NUCLEAR MAIN PUMP

(71) Applicant: DALIAN SANHUAN COMPOSITE MATERIAL TECHNOLOGY DEVELOPMENT CO., LTD., Dalian, Liaoning (CN)

(72) Inventors: Dazhuang Qu, Liaoning (CN); Chengyu Sun, Liaoning (CN); Xigao Jian, Liaoning (CN); Changbo Liu, Liaoning (CN)

(73) Assignee: DALIAN SANHUAN COMPOSITE MATERIAL TECHNOLOGY DEVELOPMENT CO., LTD., Dalian, Liaoning (CN)

( * ) Notice: Subject to any disclaimer, the term of this patent is extended or adjusted under 35 U.S.C. 154(b) by 0 days.

(21) Appl. No.: 15/738,094

(22) PCT Filed: May 31, 2016

(86) PCT No.: PCT/CN2016/084013
§ 371 (c)(1),
(2) Date: Dec. 19, 2017

(87) PCT Pub. No.: WO2017/024859
PCT Pub. Date: Feb. 16, 2017

(65) Prior Publication Data
US 2018/0187720 A1    Jul. 5, 2018

(30) Foreign Application Priority Data

Aug. 10, 2015 (CN) .......................... 2015 1 0486583
Aug. 10, 2015 (CN) ..................... 2015 2 0600658 U

(51) Int. Cl.
*F16C 33/20*    (2006.01)
*F16C 33/10*    (2006.01)
(Continued)

(52) U.S. Cl.
CPC .......... *F16C 33/205* (2013.01); *F04D 29/046* (2013.01); *F04D 29/061* (2013.01);
(Continued)

(58) Field of Classification Search
CPC ..... F16C 2226/70; F16C 33/20–33/208; F16C 29/045; F16C 29/061; F16C 33/1025; F16C 33/6637; G21D 1/04
See application file for complete search history.

(56) References Cited

U.S. PATENT DOCUMENTS 1,331,961 A * 2/1920 Klocke ................... F16C 33/14
                                                    29/898.059
1,732,273 A * 10/1929 Landon ................... F16C 33/14
                                                    29/898.059
(Continued)

FOREIGN PATENT DOCUMENTS

CN    1035871 A    9/1989
CN    2298366 Y    11/1998
(Continued)

OTHER PUBLICATIONS

Machine Translation of CN1035871 (Year: 1989).*
Machine translation of CN2298366 (Year: 1998).*

*Primary Examiner* — Alan B Waits
(74) *Attorney, Agent, or Firm* — Novick, Kim & Lee, PLLC; Allen Xue

(57) ABSTRACT

A water lubricated composite thrust bearing of a nuclear main pump has a stainless steel base and an engineering plastic layer. The stainless steel base is provided with a concave-convex surface connected to the engineering plastic (Continued)

layer. The concave-convex surface and the engineering plastic layer are compositely molded by means of thermoplastic compound molding. A ratio of the area of the concave-convex surface to the area of an orthographic projection of the concave-convex surface on the stainless steel base ranges from 1.2 to 2. By means of the concave-convex surface and a specific bonding property obtained after fusion of a rough face and the engineering plastic layer, the concave-convex surface is bonded with the engineering plastic layer, thereby forming a reliable composite thrust bearing that is physically connected onto a whole.

11 Claims, 5 Drawing Sheets

(51) Int. Cl.
    *F16C 33/66*     (2006.01)
    *F04D 29/046*     (2006.01)
    *F04D 29/06*     (2006.01)
    *G21D 1/04*     (2006.01)

(52) U.S. Cl.
    CPC .......... *F16C 33/1025* (2013.01); *F16C 33/20* (2013.01); *F16C 33/6637* (2013.01); *F16C 33/201* (2013.01); *G21D 1/04* (2013.01)

(56) References Cited

U.S. PATENT DOCUMENTS

| | | | | |
|---|---|---|---|---|
| 4,084,863 A * | 4/1978 | Capelli | ................... | F16C 11/06 384/202 |
| 4,248,915 A * | 2/1981 | Vinciguerra | ............ | B05D 3/12 29/524 |
| 5,355,969 A * | 10/1994 | Hardy | ................... | B23B 27/146 175/432 |
| 5,871,060 A * | 2/1999 | Jensen | ................ | E21B 10/5673 175/420.2 |
| 6,148,937 A * | 11/2000 | Mensa-Wilmot | ..... | B23B 27/146 175/428 |
| 6,149,695 A * | 11/2000 | Adia | ....................... | B23B 51/00 407/119 |
| 6,488,106 B1 * | 12/2002 | Dourfaye | ............ | E21B 10/5735 175/428 |
| 7,493,972 B1 * | 2/2009 | Schmidt | .............. | E21B 10/5735 175/432 |
| 8,801,291 B2 * | 8/2014 | Kamata | ................... | F16C 33/08 384/276 |
| 2004/0190804 A1 * | 9/2004 | John | ....................... | F16C 17/04 384/420 |
| 2013/0023451 A1 * | 1/2013 | Matsuhisa | ............. | F16C 33/205 508/103 |
| 2014/0153852 A1 * | 6/2014 | Long | ...................... | F03B 11/06 384/129 |
| 2016/0138652 A1 * | 5/2016 | Etchart Randlett | ...... | B05D 3/12 428/167 |

FOREIGN PATENT DOCUMENTS

| | | |
|---|---|---|
| CN | 2497092 Y | 6/2002 |
| CN | 2589734 Y | 12/2003 |
| CN | 102869892 A | 1/2013 |
| CN | 103410863 A | 11/2013 |
| CN | 103497483 A | 1/2014 |
| EP | 0802338 A2 * | 10/1997 |
| JP | H04203620 A | 7/1992 |
| JP | 2004-019857 A | 1/2004 |

* cited by examiner

WATER LUBRICATED COMPOSITE THRUST BEARING OF NUCLEAR MAIN PUMP

TECHNICAL FIELD

The present invention relates to a water lubricated composite thrust bearing, and more particularly to a water lubricated composite thrust bearing of a nuclear main pump. This product is mainly applicable to a bearing of a nuclear island primary loop system of a nuclear power plant for a circulating pump (a nuclear main pump) for driving a coolant in a nuclear radiation condition environment, may also be used in a variety of fields of rotary mechanical support parts bearing a thrust, such as hydropower unit, water pump and deceleration machine, etc., and is also applicable to oil lubrication, especially to high temperature and high speed using conditions.

BACKGROUND ART

At present, a nuclear island primary loop coolant circulating pump (nuclear main pump for short) is the key equipment of the nuclear power plant. The nuclear main pump plays a vital role on the operation and safety of the entire nuclear power plant, while a bearing of the nuclear main pump is a key component to ensure that the circulating pump operates safely and reliably.

Bearings of nuclear main pumps configured for small-capacity generator units of nuclear power plants at home and abroad are water lubricated thrust bearings made of graphite materials. The structure of the water lubricated thrust bearing is that a graphite plate is placed in a clamping groove of a sector-shaped steel tile base and two sides of the graphite plate are fixed with baffle plates. As the graphite is a kind of brittle material which has poorer impact resistance, in the larger impact load and alternating load conditions, the tile is easy to break, poor in safety and reliability and not suitable for long-term safe operation of high-power nuclear main pumps. In addition, due to brittleness and poor adaptability, the graphite bearing material cannot adjust the uneven stress condition on the whole set of bearing and the single tile surface by itself and is prone to causing an unbalanced loading condition.

Secondly, the water lubricated thrust bearing is made of a metal plate and an engineering plastic plate using a mechanical combination structure. This structure is mounted and located by a clamping groove on the plane of the steel tile and fastened with bolts. Because this structure is mounted by splicing multiple layers of structures, the fastening screws and the bearing in the long-time running process have defects of loosening, falling and connection instability to increase accident points, thereby bringing potential safety hazards for the running of the nuclear main pump.

Nowadays, nuclear power gradually shifts to the development of large-capacity generator units. The prior art has not adapted to the use requirements of high-power nuclear main pumps, and nuclear main pump bearings have become the bottleneck in the development of large-capacity nuclear power equipment. Therefore, it is urgent to provide a thrust bearing for a high-power nuclear main pump, which is resistant to nuclear radiation and adapted to water lubrication, safe and reliable.

SUMMARY OF THE INVENTION

With respect to the technical problems that graphite plate in the prior art proposed above has poor impact resistance and is not adapted to using requirements of high-power nuclear main pump, and the fastening screws required for splicing a metal plate and an engineering plastic plate are easy to falling off, there is provided a novel thrust bearing pad which engineering plastic with favorable toughness and a stainless steel base are completely formed into an integrated structure, and a water lubricated composite thrust bearing of a nuclear main pump is formed by a circular ring consisting of a plurality of sector-shaped or circular pads.

The technical means of the present invention is as follows:

A water lubricated composite thrust bearing of a nuclear main pump comprises a stainless steel base and an engineering plastic layer, wherein the stainless steel base is provided with concave-convex surfaces connected to the engineering plastic layer; the concave-convex surfaces and the engineering plastic layer are compositely formed by means of thermoplastic compound molding; a ratio of the area of the concave-convex surface to the area of an orthographic projection of the concave-convex surface on the stainless steel base ranges from 1.2 to 2. The surface area of the stainless steel base is increased by means of the above arrangements to increase a bonding strength between the stainless steel base and the engineering plastic layer, and the area of the concave-convex surface refers to a superficial area of the concave-convex surface.

The concave-convex surfaces are positioned on the upper surface of the stainless steel base and the lower surface of the stainless steel base respectively, wherein the thickness of the engineering plastic layer on the concave-convex surface positioned on the upper surface of the stainless steel base is 2 to 15 mm, and the thickness of the engineering plastic layer on the concave-convex surface positioned on the lower surface of the stainless steel base is 0.5 to 5 mm.

The concave-convex surface is positioned on the upper surface of the stainless steel base, and the thickness of the engineering plastic layer is 2 to 15 mm.

The convex surface of the concave-convex surface is provided with rough face. The rough face is obtained by a treatment method which including the following three methods or a combination of the following three methods:

(1) performing a knurling treatment with knurling wheel, a knurling pitch being about 0.3 to 1.5 mm;

(2) forming criss-cross grooves which are 0.5 to 1.5 mm wide and 0.2 to 0.8 mm depth through mechanical machining, or machining grooves which are staggered longitudinally and transversely with an angle of 30° to 90° and a depth of 0.2 to 0.8 mm; and (3) performing a roughening treatment, such as surface sandblasting, etc.

The stainless steel base is sector-shaped or circular; the concave surface of the concave-convex surface is composed of a plurality of annular grooves, the shape of the annular grooves being matched with the outer edge of the stainless steel base, the plurality of the annular grooves being arranged at equal intervals, the distance between the adjacent annular grooves being 6 to 10 mm, the width of a rabbet of the annular groove being 4 to 12 mm, the width of a bottom of the annular groove being 0.5 to 1 mm larger than the width of a rabbet of the annular groove, and the depth of the annular groove being 1 to 5 mm.

The stainless steel base is sector-shaped or circular; the concave surface of the concave-convex surface is composed of a plurality of transverse grooves and a plurality of longitudinal grooves, the plurality of transverse grooves being arranged at equal intervals, the distance between the adjacent transverse grooves being 6 to 10 mm, the width of a rabbet of the transverse groove being 4 to 12 mm, the width of a bottom of the transverse groove being 0.5 to 1 mm larger than the width of a rabbet of the transverse groove, and the depth of the transverse groove being 1 to 5 mm; the plurality of longitudinal grooves being arranged at equal intervals, the distance between the adjacent longitudinal grooves being 6 to 10 mm, the width of a rabbet of the longitudinal groove being 4 to 12 mm, the width of a bottom of the longitudinal groove being 0.5 to 1 mm larger than the width of a rabbet of the longitudinal groove, and the depth of the longitudinal groove being 1 to 5 mm.

The stainless steel base is sector-shaped; the concave surface of the concave-convex surface is composed of a plurality of arc-shaped grooves, the shape of the arc-shaped groove being matched with an arc of the sector, the plurality of the arc-shaped grooves being arranged at equal intervals along a radius direction of the sector, the distance between the adjacent arc-shaped grooves being 6 to 10 mm, the width of a rabbet of the arc-shaped groove being 4 to 12 mm, the width of a bottom of the arc-shaped groove being 0.5 to 1 mm larger than the width of a rabbet of the arc-shaped groove, and the depth of the arc-shaped groove being 1 to 5 mm.

The stainless steel base is sector-shaped or circular, and the concave surface of the concave-convex surface is composed of a plurality of blind holes that are arranged in order, the distance between the adjacent blind holes being 6 to 10 mm, the diameter of an opening of the blind hole being 4 to 10 mm, the diameter of a bottom of the blind hole being 0.5 to 1 mm larger than the diameter of an opening of the blind hole, and the depth of the blind hole being 1 to 5 mm. The blind holes arranged in order means that the blind holes may be arranged in square, rectangle, rhombus, triangle or matrix form, etc.

The engineering plastic layer is a single-layer engineering plastic layer or a composite engineering plastic layer, and the composite engineering plastic layer comprises a modified layer and a non-modified layer, the modified layer being connected to the concave-convex surface via the non-modified layer; the single-layer engineering plastic layer being made of modified polyether ether ketone powder or modified Polyphthalazinone ether sulfone ketone (PPESK) powder, the modified layer being made of modified polyether ether ketone powder or modified poly phthalazinone ether sulfone ketone powder, and the non-modified layer being made of pure resin powder.

The pure resin powder refers to non-modified polyether ether ketone powder or non-modified poly phthalazinone ether sulfone ketone powder. If the modified layer is made of modified polyether ether ketone powder, the pure resin powder is pure polyether ether ketone powder; if the modified layer is made of modified poly ether sulfone powder, the pure resin powder is poly phthalazinone ether sulfone ketone powder.

The thickness of the modified layer is $2/3$-$4/5$ of the thickness of the composite engineering plastic layer.

The non-modified layer is added between the stainless steel base and the modified layer to improve the adhesiveness therebetween due to the decrease in the bonding property after the modification.

The concave-convex surface and the engineering plastic layer are combined through the concave surface and the convex surface of the concave-convex surface and the bonding property obtained after fusion of the rough face and the engineering plastic layer, thereby forming a reliable composite thrust bearing that is physically connected into a whole.

The engineering plastic layer positioned on the upper surface of the stainless steel base is a working surface friction layer of the thrust bearing, and the engineering plastic layer on the lower surface of the stainless steel base is a heat resistant layer of the thrust bearing.

The thermoplastic compound molding has the following steps:

(1) the mould of the thermoplastic compound molding is made of heat-resistant stainless steel, the shape and size of a concave mold cavity of the mould are designed, processed and matched according to the geometrical shape and size of the outer edge of a workblank of the stainless steel base, and the mould is arranged exhaust channels;

(2) drying the modified polyether ether ketone resin powder or the modified poly phthalazinone ether sulfone ketone resin powder at 120° C. for 8 hours or more before molding, and when the engineering plastic layer is a composite engineering plastic layer, drying a certain amount of non-modified pure resin powder according to the same drying condition;

(3) putting the stainless steel base in the concave mold of the mould;

(4) when the engineering plastic layer is a composite engineering plastic layer, wherein the thickness of the composite engineering plastic layer, $2/3$ to $4/5$ of which is the modified polyether ether ketone resin powder or the modified poly phthalazinone ether sulfone ketone resin powder, and $1/5$ to $1/3$ of which is pure resin powder. Calculating and weighing the amount of the used materials according to the different thicknesses, uniformly putting the pure resin powder onto the stainless steel base in a concave mold cavity and striking off first, and then uniformly putting the modified resin powder into the concave mold cavity of the mould, striking off and closing the mould;

when the engineering plastic layer is a single-layer engineering plastic layer, weighing the mount of the material according to the thickness of the single-layer engineering plastic layer, uniformly putting the modified resin powder in a concave mold cavity of the mould, striking off and closing the mould;

(5) applying a pressure of 30 to 80 MPa to the mould on a press;

(6) putting the whole mould in an air circulating heating furnace, and heating to 350 to 410° C., such that the powder is molten completely, wherein the heating time depends on the specification of the workpiece and the size of the mould;

(7) putting the mould on the press after heating, applying a pressure of 30 to 60 MPa while maintaining the pressure, and cooling at a cooling rate of 30 to 60° C./h, demoulding after the temperature of the mould drops to below 70° C., and taking the workpiece out; and (8) performing mechanical machining to form the water lubricated composite material thrust bearing.

When the concave-convex surfaces are positioned on the upper surface of the stainless steel base and the lower surface of the stainless steel base respectively, in the above step (4), the amounts of powder required for the engineering plastic layers positioned on two parts, i.e., the upper and lower surfaces of the stainless steel base need to be calculated and weighed first respectively, and then, the powder required for the engineering plastic layer positioned on the lower surface of the stainless steel base is uniformly put in the mould, struck-off and then put in the stainless steel base.

Compared with the prior art, the working surface friction layer of the present invention is the engineering plastic layer, which is a kind of elastic and plastic material, has favorable impact resistance and compliance, and effectively overcomes the defect that a graphite bearing is easy to break.

The concave-convex surface and the engineering plastic layer are combined through the concave surface and the convex surface of the concave-convex face and the bonding property obtained after fusion of the rough face and the engineering plastic layer, thereby forming a reliable composite thrust bearing that is physically connected into a whole. Since the present invention is of a composite structure in which metal and nonmetal are combined into a whole firmly, respective advantages of metal and nonmetal can be brought into play. The thickness of the engineering plastic layer can be greatly reduced, not only improves the bearing capability, but also the size of the bearing still has good stability under the effect of pressure and temperature during operating, which is conductive to establishment of a stable safe lubrication water film; and the water lubricated composite thrust bearing of the present invention is a safe and reliable novel water lubricated composite thrust bearing with resistance to nuclear radiation. The water lubrication composite thrust bearing disclosed by the present invention has the characteristics of impact resistance, abrasion resistance, low friction, self-lubricating, compliance and self-adjusting in addition to good resistance to radiation and water lubrication.

The present invention may be widely promoted in the fields of thrust bearings and the like for the above-mentioned reasons.

BRIEF DESCRIPTION OF THE DRAWINGS

The present invention will be further described in detail as below in conjunction with drawings and specific embodiments.

DETAILED DESCRIPTION OF THE PREFERRED EMBODIMENTS

Figure 1:
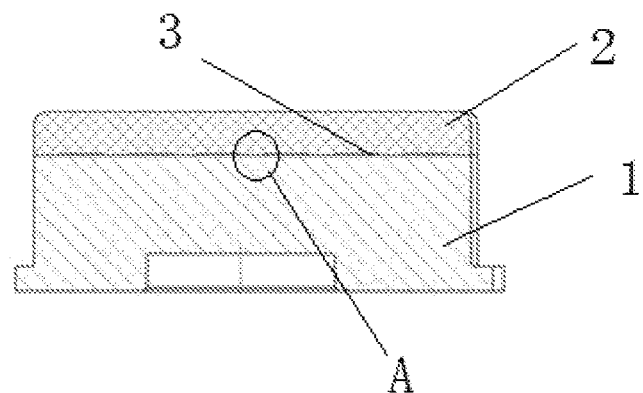
FIG. 1 is a structural schematic diagram of a combination of a stainless steel base and an engineering plastic layer according to Embodiment 1 of the present invention.

As shown in FIGS. 1 to 10, a water lubricated composite thrust bearing of a nuclear main pump comprises a stainless steel base 1 and an engineering plastic layer 2, wherein the stainless steel base 1 is provided with concave-convex surfaces 3 connected to the engineering plastic layer 2; the concave-convex surfaces 3 and the engineering plastic layer 2 are compositely formed by means of thermoplastic compound molding; a ratio of the area of the concave-convex surface 3 to the area of an orthographic projection of the concave-convex surface 3 on the stainless steel base 1 ranges from 1.2 to 2.

The concave-convex surface 3 is positioned on the upper surface of the stainless steel base 1, or the concave-convex surfaces 3 are positioned on the upper surface of the stainless steel base 1 and the lower surface of the stainless steel base 1 respectively, the thickness of the engineering plastic layer 2 on the concave-convex surface 3 positioned on the upper surface of the stainless steel base 1 is 2 to 15 mm, and the thickness of the engineering plastic layer 2 on the concave-convex surface 3 positioned on the lower surface of the stainless steel base 1 is 0.5 to 5 mm.

The convex surface of the concave-convex surface 3 is provided with rough face 4.

When the stainless steel base 1 is sector-shaped or circular, the concave surface of the concave-convex surface 3 is composed of a plurality of annular grooves 5, the shape of the annular grooves 5 are matched with the outer edge of the stainless steel base 1, the plurality of the annular grooves 5 are arranged at equal intervals, the distance between the adjacent annular grooves 5 is 6 to 10 mm, the width of a rabbet of the annular groove 5 is 4 to 12 mm, the width of a bottom of the annular groove 5 is 0.5 to 1 mm larger than the width of a rabbet of the annular groove 5, and the depth of the annular groove 5 is 1 to 5 mm.

Alternatively, the concave surface of the concave-convex surface 3 is composed of a plurality of transverse grooves 6 and a plurality of longitudinal grooves 7, the plurality of transverse grooves 6 are arranged at equal intervals, the distance between the adjacent transverse grooves 6 is 6 to 10 mm, the width of a rabbet of the transverse groove 6 is 4 to 12 mm, the width of a bottom of the transverse groove 6 is 0.5 to 1 mm larger than the width of a rabbet of the transverse groove 6, and the depth of the transverse groove 6 is 1 to 5 mm; the plurality of longitudinal grooves 7 are arranged at equal intervals, the distance between the adjacent longitudinal grooves 7 is 6 to 10 mm, the width of a rabbet of the longitudinal groove 7 is 4 to 12 mm, the width of a bottom of the longitudinal groove 7 is 0.5 to 1 mm larger than the width of a rabbet of the longitudinal groove 7, and the depth of the longitudinal groove 7 is 1 to 5 mm.

Alternatively, the concave surface of the concave-convex surface 3 is composed of a plurality of blind holes 9 that are arranged in order, the distance between the adjacent blind holes is 6 to 10 mm, the diameter of a hole opening of the blind hole 9 is 4 to 10 mm, the diameter of a hole bottom of the blind hole 9 is 0.5 to 1 mm larger than the diameter of a hole opening of the blind hole 9, and the depth of the blind hole 9 is 1 to 5 mm.

When the stainless steel base 1 is sector-shaped, the concave surface of the concave-convex surface 3 is composed of a plurality of arc-shaped grooves 8, the shape of the arc-shaped groove 8 is matched with the arc of the sector, the plurality of the arc-shaped grooves 8 are arranged at equal intervals along a radius direction of the sector, the distance between the adjacent arc-shaped grooves 8 is 6 to 10 mm, the width of a rabbet of the arc-shaped groove 8 is 4 to 12 mm, the width of a bottom of the arc-shaped groove 8 is 0.5 to 1 mm larger than the width of a rabbet of the arc-shaped groove 8, and the depth of the arc-shaped groove 8 being 1 to 5 mm.

The engineering plastic layer 2 is a single-layer engineering plastic layer or a composite engineering plastic layer, the composite engineering plastic layer comprises a modified layer and a non-modified layer, and the modified layer is connected to the concave-convex surface 3 via the non-modified layer.

The single-layer engineering plastic layer is made of modified polyether ether ketone powder or modified Polyphthalazinone ether sulfone ketone powder, the modified layer is made of modified polyether ether ketone powder or modified poly phthalazinone ether sulfone ketone powder, and the non-modified layer is made of pure resin powder.

The thickness of the modified layer is ⅔-⅘ of the thickness of the composite engineering plastic layer.

The present invention will now be further described by way of embodiments.

Embodiment 1

Figure 2:
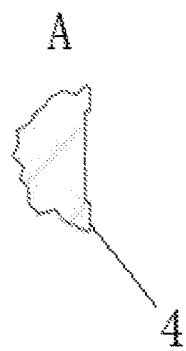
FIG. 2 is an enlarged structural schematic diagram of part A in FIG. 1.
Figure 4:
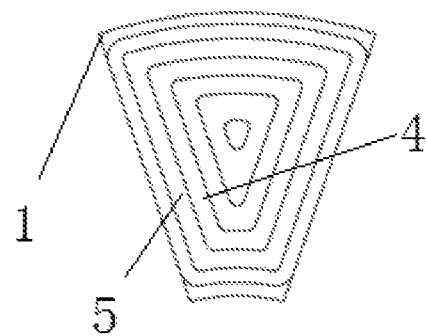
FIG. 4 is a structural schematic diagram of a sector-shaped stainless steel base with annular grooves according to the present invention.
Figure 5:
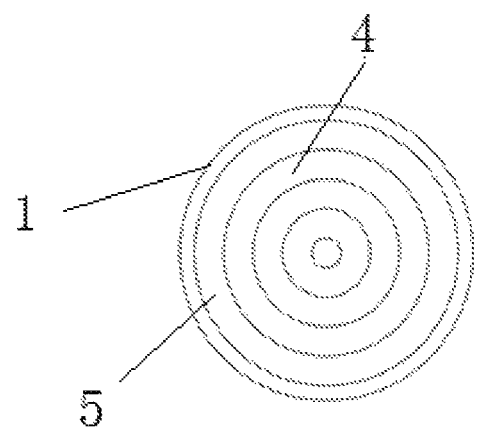
FIG. 5 is a structural schematic diagram of a circular stainless steel base with annular grooves according to the present invention.
Figure 6:
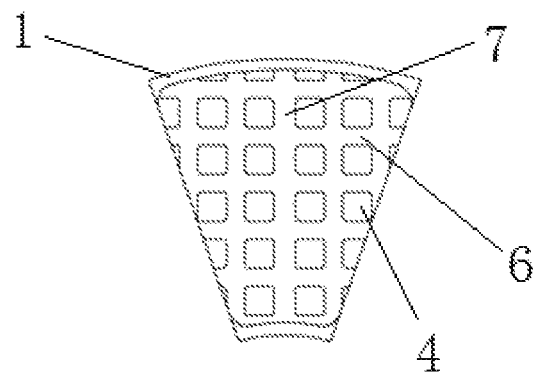
FIG. 6 is a structural schematic diagram of a sector-shaped stainless steel base with transverse grooves and longitudinal grooves according to the present invention.
Figure 7:
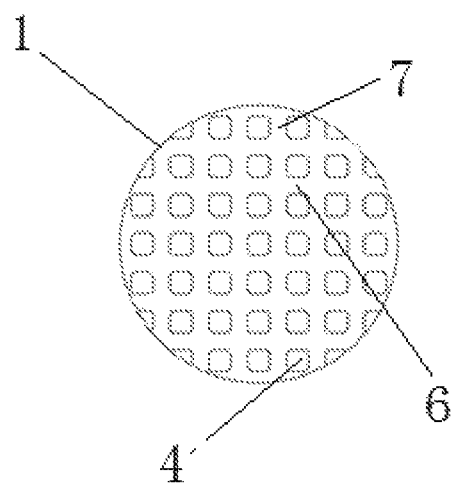
FIG. 7 is a structural schematic diagram of a circular stainless steel base with transverse grooves and longitudinal grooves according to the present invention.
Figure 8:
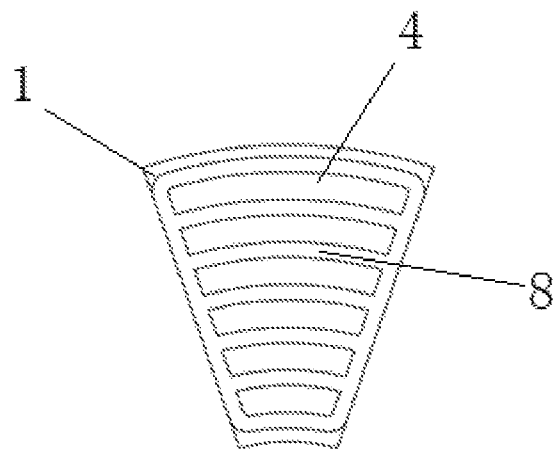
FIG. 8 is a structural schematic diagram of a stainless steel base with arc-shaped grooves according to the present invention.
Figure 9:
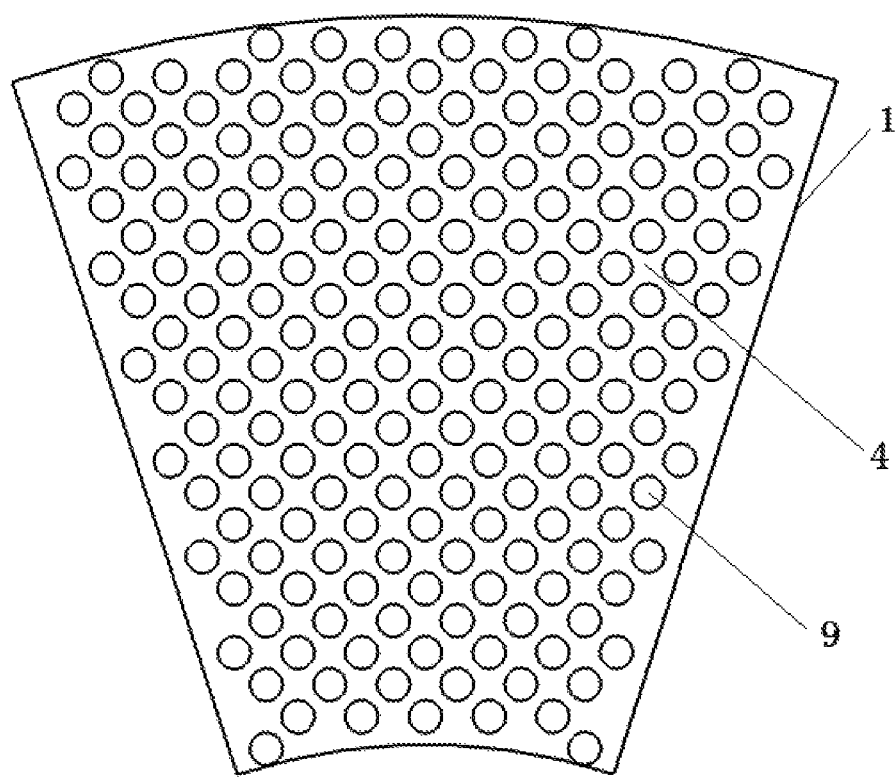
FIG. 9 is a structural schematic diagram of a sector-shaped stainless steel base with blind holes according to the present invention.
Figure 10:
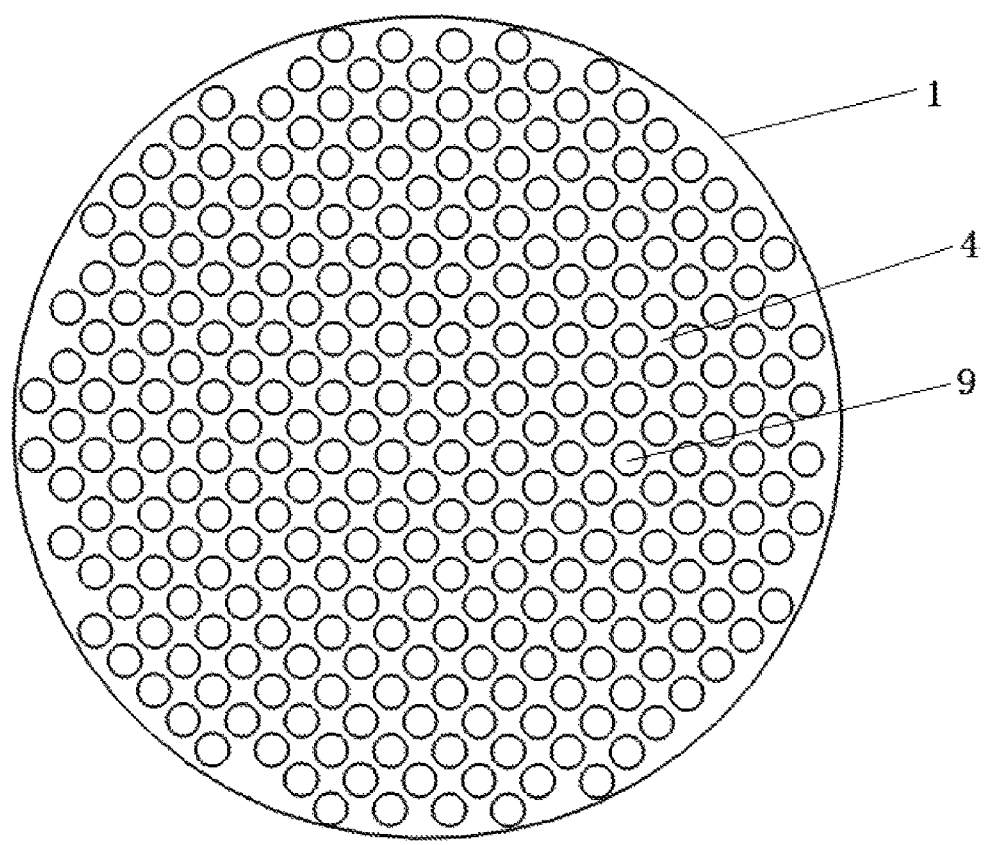
FIG. 10 is a structural schematic diagram of a circular stainless steel base with blind holes according to the present invention.

As shown in FIGS. 1, 2 and 4, a water lubricated composite thrust bearing of a nuclear main pump comprises a stainless steel base 1 and an engineering plastic layer 2, wherein the stainless steel base 1 is sector-shaped and has a concave-convex surface 3 connected to the engineering plastic layer 2, the concave-convex surface 3 is positioned on the upper surface of the stainless steel base 1, and the thickness of the engineering plastic layer 2 is 2 to 15 mm.

The engineering plastic layer 2 is a composite engineering plastic layer. The composite engineering plastic layer comprises a modified layer and a non-modified layer, the modified layer is connected to the concave-convex surface 3 via the non-modified layer, the modified layer is made of modified polyether ether ketone powder or modified Polyphthalazinone ether sulfone ketone powder, and the non-modified layer is made of pure resin powder.

The thickness of the modified layer is ⅔ of the thickness of the composite engineering plastic layer. The concave surface of the concave-convex surface 3 is composed of a plurality of annular grooves 5, the shape of the annular groove 5 is matched with the outer edge of the stainless steel base 1, the plurality of the annular grooves 5 are arranged at equal intervals, the distance between the adjacent annular grooves 5 is 10 mm, the width of a rabbet of the annular groove 5 is 5 mm, the width of a bottom of the annular groove 5 is 5.5 mm, the depth of the annular groove 5 is 1 mm, i.e. the cross section of the annular groove 5 is swallowtail shape. The annular groove 5 positioned near the outer edge of the stainless steel tile 1 is spaced 5 mm from the outer edge of the stainless steel base 1. A ratio of the area of the concave-convex surface 3 to the area of an orthographic projection of the concave-convex surface 3 on the stainless steel base 1 is 1.2. The convex surface of the concave-convex surface 3 is provided with rough face 4. The rough face 4 is obtained by a knurling treatment with a knurling wheel, and a knurling pitch is about 0.9 mm.

The concave-convex surface 3 and the engineering plastic layer 2 are formed by thermoplastic compound molding.

The thermoplastic compound molding compounding has the following steps:

(1) a thermoplastic compound molding mould is made of heat-resistant stainless steel, the shape and size of a concave mold cavity of the mould are designed, processed and matched according to the geometrical shape and size of the outer edge of a workblank of the stainless steel base 1, and the mould is arranged exhaust channels;

(2) drying the modified polyether ether ketone resin powder or the modified poly phthalazinone ether sulfone ketone resin powder at 120° C. for more than 8 hours before molding, and drying a certain amount of non-modified pure resin powder according to the same drying condition;

(3) putting the stainless steel base 1 in the concave mold of the mould;

(4) according to the thickness of the engineering plastic layer 2, ⅔ of which is the modified polyether ether ketone resin powder or the modified Polyphthalazinone ether sulfone ketone resin powder, and ⅓ of which is pure resin powder; calculating and weighing the amount of the used materials according to the different thicknesses, uniformly putting the pure resin powder onto the stainless steel base in a concave mold cavity and striking off first, and then uniformly putting the modified resin powder into the concave mold cavity of the mould, striking off and closing the mould;

(5) applying a pressure of 30 to 80 MPa to the mould on a press;

(6) putting the whole mould in an air circulating heating furnace, and heating to 385° C. to melt the powder completely, wherein the heating time depends on the specification of the workpiece and the size of the mould;

(7) putting the mould on the press after heating, applying a pressure of 30 MPa while maintaining the pressure, and cooling at a cooling rate of 30 to 60° C./h, demoulding after the temperature of the mould drops to below 70° C., and taking the workpiece out; and (8) performing mechanical machining to form the water lubricated composite material thrust bearing.

Embodiment 2

Figure 3:
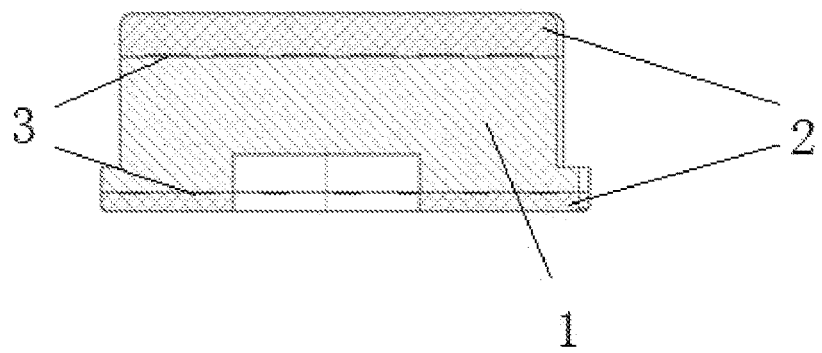
FIG. 3 is a structural schematic diagram of a combination of a stainless steel base and an engineering plastic layer according to Embodiment 2 of the present invention.

As shown in FIGS. 3 and 4, compared with the water lubricated composite thrust bearing of the nuclear main pump disclosed in embodiment 1, the present embodiment has the following distinguishing features: both the upper surface of the stainless steel base 1 and the lower surface of the stainless steel base 2 are provided with the concave-convex surface 3 disclosed in embodiment 1; in the step (4) disclosed in Embodiment 1, the amounts of the polyether ether ketone resin powder or the modified Polyphthalazinone ether sulfone ketone resin required for the engineering plastic layers 2 positioned on two parts, i.e., the upper and lower surfaces of the stainless steel base 1, as well as the amount of the pure resin powder need to be calculated and weighed first respectively; and then, the polyether ether ketone resin powder or the modified Polyphthalazinone ether sulfone ketone resin required for the engineering plastic layer positioned on the lower surface of the stainless steel base 1 and the pure resin powder are uniformly put in the mould, struck-off and then put in the stainless steel base 1.

The contents described above are merely preferred detailed embodiments of the present invention without limiting the protection scope of the present invention in any way. That person skilled in the art can make equivalent replacements or changes to the present invention, which according to the technical solutions and inventive concepts within the disclosed technical scope of the present invention, shall fall into the protection scope of the present invention.

The invention claimed is:

1. A water lubricated composite thrust bearing of a nuclear main pump, comprising:

a stainless steel base having an upper concave-convex surface and a lower concave-convex surface;
an upper engineering plastic layer disposed on the upper concave-convex surface; and
a lower engineering plastic layer disposed on the lower concave-convex surface, wherein a ratio of an area of the upper or the lower concave-convex surface to an area of an orthographic projection of the upper or the lower concave-convex surface on the stainless steel base ranges from 1.2 to 2,
wherein a thickness of the upper engineering plastic layer is 2 to 15 mm, and a thickness of the lower engineering plastic layer is 0.5 to 5 mm,
wherein at least one of the upper engineering plastic layer and the lower engineering layer is a composite engineering plastic layer comprising a modified layer and a non-modified layer fused together, the non-modified layer being bonded to the concave-convex surface,
wherein the modified layer is made of modified polyether ether ketone or modified polyphthalazinone ether sulfone ketone, and the non-modified layer is made of polyether ether ketone or polyphthalazinone ether sulfone ketone, and
wherein a thickness of the modified layer is $2/3$ to $4/5$ of a thickness of the composite engineering plastic layer.

2. The water lubricated composite thrust bearing of the nuclear main pump according to claim 1, wherein a convex portion of at least one of the concave-convex surfaces is roughened by knurling using a knurl wheel having a pitch of about 0.3-1.5 mm.

3. The water lubricated composite thrust bearing of the nuclear main pump according to claim 2, wherein the stainless steel base is sector-shaped or circular; the concave surface of the concave-convex surface is composed of a plurality of annular grooves, the shape of the annular grooves being matched with the outer edge of the stainless steel base, the plurality of the annular grooves being arranged at equal intervals, a distance between the adjacent annular grooves being 6 to 10 mm, a width of a rabbet of the annular groove being 4 to 12 mm, a width of a bottom of the annular groove being 0.5 to 1 mm larger than the width of the rabbet of the annular groove, and a depth of the annular groove being 1 to 5 mm.

4. The water lubricated composite thrust bearing of the nuclear main pump according to claim 2, wherein the stainless steel base is sector-shaped or circular; the concave surface of the concave-convex surface is composed of a plurality of transverse grooves and a plurality of longitudinal grooves, the plurality of transverse grooves being arranged at equal intervals, a distance between the adjacent transverse grooves being 6 to 10 mm, a width of a rabbet of the transverse groove being 4 to 12 mm, a width of a bottom of the transverse groove being 0.5 to 1 mm larger than the width of the rabbet of the transverse groove, and a depth of the transverse groove being 1 to 5 mm; the plurality of longitudinal grooves being arranged at equal intervals, a distance between the adjacent longitudinal grooves being 6 to 10 mm, a width of a rabbet of the longitudinal groove being 4 to 12 mm, a width of a bottom of the longitudinal groove being 0.5 to 1 mm larger than the width of the rabbet of the longitudinal groove, and a depth of the longitudinal groove being 1 to 5 mm.

5. The water lubricated composite thrust bearing of the nuclear main pump according to claim 2, wherein the stainless steel base is sector-shaped; the concave surface of the concave-convex surface is composed of a plurality of arc-shaped grooves, the shape of the arc-shaped groove being matched with an arc of the sector, the plurality of the arc-shaped grooves being arranged at equal intervals along a radius direction of the sector, a distance between the adjacent arc-shaped grooves being 6 to 10 mm, a width of a rabbet of the arc-shaped groove being 4 to 12 mm, a width of a bottom of the arc-shaped groove being 0.5 to 1 mm larger than the width of the rabbet of the arc-shaped groove, and a depth of the arc-shaped groove being 1 to 5 mm.

6. The water lubricated composite thrust bearing of the nuclear main pump according to claim 2, wherein the stainless steel base is sector-shaped or circular, and the concave surface of the concave-convex surface is composed of a plurality of blind holes that are arranged in order, a distance between the adjacent blind holes being 6 to 10 mm, a diameter of an opening of the blind hole being 4 to 10 mm, a diameter of a bottom of the blind hole being 0.5 to 1 mm larger than the diameter of the opening of the blind hole, and a depth of the blind hole being 1 to 5 mm.

7. The water lubricated composite thrust bearing of the nuclear main pump according to claim 1, wherein the stainless steel base is sector-shaped or circular; a concave surface of each of the concave-convex surfaces is composed of a plurality of annular grooves, the shape of the annular grooves being matched with the outer edge of the stainless steel base, the plurality of the annular grooves being arranged at equal intervals, a distance between the adjacent annular grooves being 6 to 10 mm, a width of a rabbet of the annular groove being 4 to 12 mm, a width of a bottom of the annular groove being 0.5 to 1 mm larger than the width of the rabbet of the annular groove, and a depth of the annular groove being 1 to 5 mm.

8. The water lubricated composite thrust bearing of the nuclear main pump according to claim 1, wherein the stainless steel base is sector-shaped or circular; the concave surface of the concave-convex surface is composed of a plurality of transverse grooves and a plurality of longitudinal grooves, the plurality of transverse grooves being arranged at equal intervals, a distance between the adjacent transverse grooves being 6 to 10 mm, a width of a rabbet of the transverse groove being 4 to 12 mm, a width of a bottom of the transverse groove being 0.5 to 1 mm larger than the width of the rabbet of the transverse groove, and a depth of the transverse groove being 1 to 5 mm; the plurality of longitudinal grooves being arranged at equal intervals, a distance between the adjacent longitudinal grooves being 6 to 10 mm, a width of a rabbet of the longitudinal groove being 4 to 12 mm, a width of a bottom of the longitudinal groove being 0.5 to 1 mm larger than the width of the rabbet of the longitudinal groove, and a depth of the longitudinal groove being 1 to 5 mm.

9. The water lubricated composite thrust bearing of the nuclear main pump according to claim 1, wherein the stainless steel base is sector-shaped; the concave surface of the concave-convex surface is composed of a plurality of arc-shaped grooves, the shape of the arc-shaped groove being matched with an arc of the sector, the plurality of the arc-shaped grooves being arranged at equal intervals along a radius direction of the sector, a distance between the adjacent arc-shaped grooves being 6 to 10 mm, a width of a rabbet of the arc-shaped groove being 4 to 12 mm, a width of a bottom of the arc-shaped groove being 0.5 to 1 mm larger than the width of the rabbet of the arc-shaped groove, and a depth of the arc-shaped groove being 1 to 5 mm.

10. The water lubricated composite thrust bearing of the nuclear main pump according to claim 1, wherein the stainless steel base is sector-shaped or circular, and the concave surface of the concave-convex surface is composed of a plurality of blind holes that are arranged in order, a distance between the adjacent blind holes being 6 to 10 mm, a diameter of an opening of the blind hole being 4 to 10 mm, a diameter of a bottom of the blind hole being 0.5 to 1 mm larger than the diameter of the opening of the blind hole, and a depth of the blind hole being 1 to 5 mm.

11. The water lubricated composite thrust bearing of the nuclear main pump according to claim 1, wherein the modified layer is made of modified polyphthalazinone ether sulfone ketone, and the non-modified layer is made of polyphthalazinone ether sulfone ketone.

* * * * *